United States Patent
Hoang et al.

(10) Patent No.: US 8,578,959 B2
(45) Date of Patent: Nov. 12, 2013

(54) RINSE VALVE FOR VACUUM WASTE SYSTEM

(75) Inventors: Thao Hoang, Rockford, IL (US); Mark A. Pondelick, Rockford, IL (US); Christopher Hardwick, Roscoe, IL (US)

(73) Assignee: B/E Aerospace, Inc., Wellington, FL (US)

( * ) Notice: Subject to any disclaimer, the term of this patent is extended or adjusted under 35 U.S.C. 154(b) by 342 days.

(21) Appl. No.: 12/565,143

(22) Filed: Sep. 23, 2009

(65) Prior Publication Data

US 2010/0084592 A1  Apr. 8, 2010

Related U.S. Application Data

(60) Provisional application No. 61/102,653, filed on Oct. 3, 2008.

(51) Int. Cl.
*F16K 24/04* (2006.01)

(52) U.S. Cl.
USPC .......... 137/202; 4/431; 137/60; 137/205; 137/218; 137/614.2; 251/30.04

(58) Field of Classification Search
USPC ........ 137/199, 202, 613, 614.2, 217, 218, 60, 137/205; 251/30.01, 30.02, 30.03, 30.04; 4/431, 432, 433
See application file for complete search history.

(56) References Cited

U.S. PATENT DOCUMENTS

| | | | |
|---|---|---|---|
| 1,670,324 A * | 5/1928 | Teahen et al. | ....................... 4/331 |
| 2,680,714 A | 6/1954 | Carlsson et al. | |
| 2,960,996 A * | 11/1960 | Haselton | .................. 137/115.16 |
| 3,447,777 A | 6/1969 | Carlson | |
| 3,510,099 A | 5/1970 | Crump | |
| 3,722,850 A | 3/1973 | Kemper | |
| 4,237,934 A | 12/1980 | Gregory et al. | |
| 4,438,781 A | 3/1984 | Brenholt | |
| 4,511,117 A | 4/1985 | Soderstrom | |
| 4,601,210 A | 7/1986 | Brown | |
| 4,783,859 A | 11/1988 | Rozenblatt et al. | |
| 4,811,754 A | 3/1989 | Wilhelm | |
| 4,860,990 A * | 8/1989 | Fukuzawa et al. | ......... 251/30.03 |
| 5,007,117 A | 4/1991 | Oldfelt et al. | |
| 5,065,786 A | 11/1991 | Rozenblatt | |
| 5,317,763 A | 6/1994 | Frank et al. | |
| 5,464,191 A | 11/1995 | Shenk | |
| 5,515,554 A | 5/1996 | Clear et al. | |

(Continued)

*Primary Examiner* — John K Fristoe, Jr.
*Assistant Examiner* — Ian Paquette
(74) *Attorney, Agent, or Firm* — Drinker Biddle & Reath LLP

(57) ABSTRACT

The apparatus and method of the invention provides for a rinse valve for controlling the flow of rinse fluid to a vacuum waste receptacle. The rinse valve comprises a primary rinse fluid flow path and a poppet assembly intersecting the primary rinse fluid flow path. The rinse valve also comprises a solenoid-driven fluid control device having a solenoid armature movable between an inactive state in which the armature engages the poppet assembly to block flow of the rinse fluid through a poppet channel and an active state in which the solenoid armature is disengaged from the poppet assembly to allow flow of the rinse fluid through the poppet channel to raise the poppet assembly, permitting the flow of the rinse fluid through the primary rinse fluid flow path and out of the valve, the armature being located at all times out of the primary flow path of the rinse fluid.

5 Claims, 9 Drawing Sheets

(56) References Cited

U.S. PATENT DOCUMENTS

| | | | |
|---|---|---|---|
| 5,584,313 A * | 12/1996 | Britt ........................ 137/218 |
| 6,085,366 A | 7/2000 | Pondelick et al. |
| 6,186,162 B1 | 2/2001 | Purvis et al. |
| 6,202,683 B1 | 3/2001 | Smith |
| 6,240,575 B1 | 6/2001 | Polo Sanchez |
| 6,349,424 B1 | 2/2002 | Stradinger et al. |
| 6,349,425 B1 | 2/2002 | Stradinger et al. |
| 6,353,942 B1 | 3/2002 | Pondelick et al. |
| 6,394,122 B1 | 5/2002 | Sibley et al. |
| 6,484,743 B2 | 11/2002 | Baukman |
| 6,536,055 B2 | 3/2003 | Pondelick et al. |
| 6,575,425 B1 | 6/2003 | Betz |
| 6,729,368 B2 | 5/2004 | Nguyen |
| 6,732,386 B2 | 5/2004 | Anderson et al. |
| 6,748,973 B2 | 6/2004 | Lindroos |
| 6,883,188 B2 | 4/2005 | Sigler et al. |
| 6,981,285 B2 | 1/2006 | Sigler et al. |
| 7,127,749 B2 | 10/2006 | Ling |
| 7,156,363 B2 | 1/2007 | Parsons et al. |
| 7,188,822 B2 | 3/2007 | Marcichow et al. |
| 7,331,365 B2 | 2/2008 | Nguyen |
| 2006/0075546 A1 | 4/2006 | Sigler |

* cited by examiner

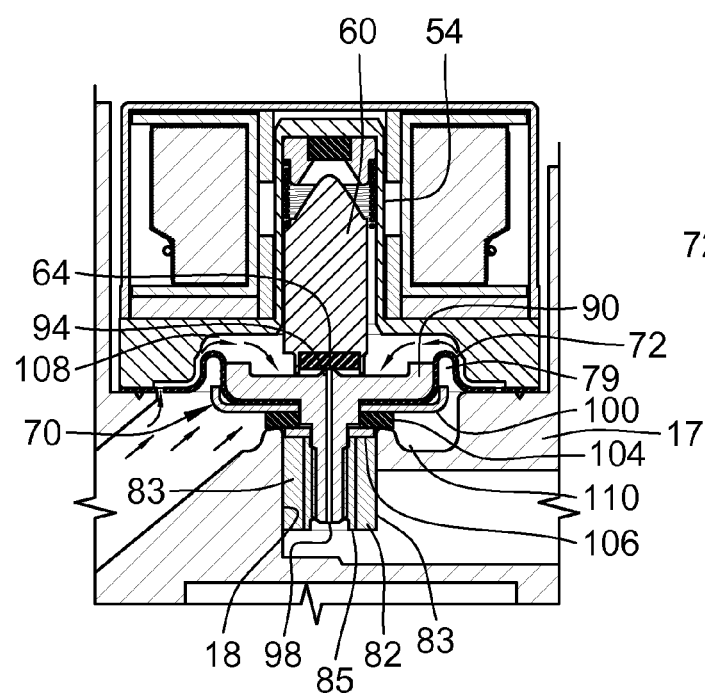
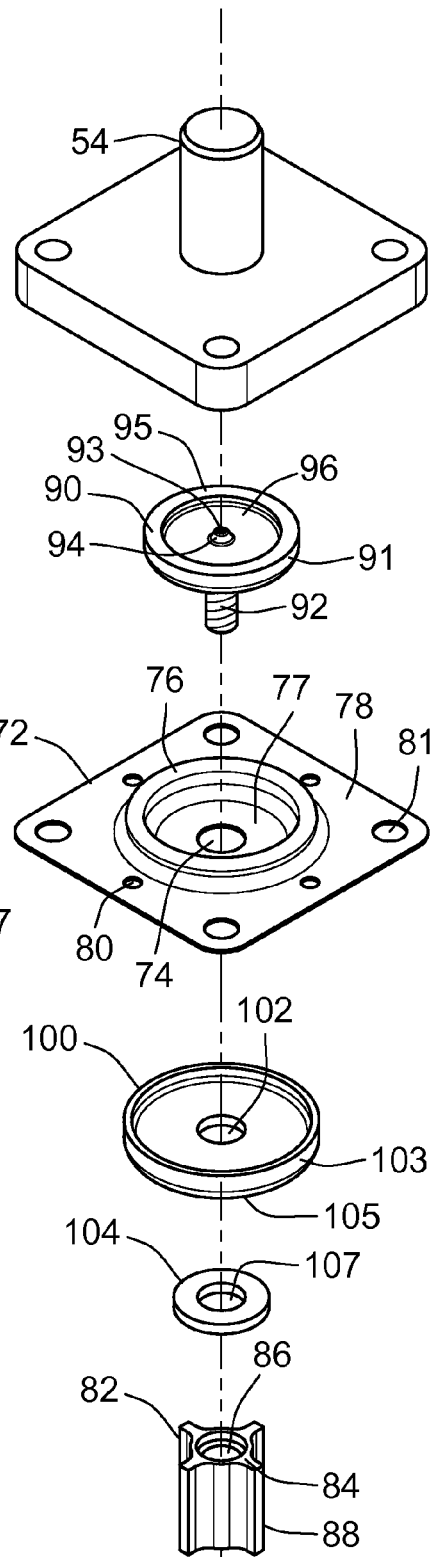
FIG. 4A
FIG. 4B

RINSE VALVE FOR VACUUM WASTE SYSTEM

CROSS-REFERENCE TO RELATED PATENT APPLICATIONS

This patent application claims the benefit of U.S. Provisional Patent Application No. 61/102,653, filed Oct. 3, 2008.

FIELD OF THE INVENTION

This invention generally pertains to vacuum waste systems and, more particularly, to rinse valves for vacuum waste receptacles such as vacuum toilets.

BACKGROUND OF THE INVENTION

Vacuum waste systems are generally known in the art for use in transportation vehicles such as airlines. Vacuum waste systems typically comprise a waste receptacle connected by a vacuum line to a waste tank. When a flush valve connected to the waste receptacle opens, the contents of the waste receptacle are removed by differential pressure to the waste tank. Generally, rinse fluid is delivered to the waste receptacle via nozzles to assist in the ease of waste removal and to clean the walls of the waste receptacle.

Conventional rinse valves for controlling the flow of aqueous rinse fluid to vacuum waste receptacles are generally known. Rinse valves are actuated when a command is initiated from a user input device such as a flush button. Such rinse valves often use solenoid actuated armature arrangements to control the flow of rinse fluid to the waste receptacle.

In typical designs for solenoid-actuated rinse valves the solenoid armature is disposed directly in the main flow path of the rinse fluid. Such prior systems present reliability problems because the substantial wetting of the armature with the rinse fluid combined with the draining of rinse fluid from adjacent the armature during servicing causes the build-up of mineral deposits on the surfaces of the armature and its housing. The friction produced by this mineral build-up initially tends to cause higher current draw to the solenoid in order to move the armature over a deposit-roughened surface. Over time, the mineral build-up may become so great that the armature may seize in the open or closed position. A rinse valve with an armature seized in the closed position will not provide rinse fluid to a toilet while a rinse valve with an armature seized in the open position will cause flooding of the lavatory area. In addition, bearing and shearing stresses on the armature and housing surfaces due to friction from mineral build-up contribute to galling and flaking of surface plating as well as contamination from micro-particles. A need therefore exists for an improved rinse valve and method for controlling the flow of rinse fluid to vacuum waste receptacles such as vacuum toilets.

Under certain circumstances a rinse valve may be exposed to very cold temperatures for a prolonged period of time. If prolonged cold exposure and inactivity occur, and the rinse fluid is not drained or is incompletely drained from the rinse valve, it is not uncommon for frozen rinse fluid to form within the rinse valve. In a conventional rinse valve, the expansion of the frozen rinse fluid inside of the valve may crack or otherwise damage the valve. A need therefore exists for an improved rinse valve and method for providing protection against damage caused by rinse fluid freezing within the rinse valve.

BRIEF SUMMARY OF THE EMBODIMENTS

The invention is generally directed to providing improved efficiency and reliability in controlling the flow of rinse fluid for the operation of vacuum waste receptacles. The apparatus and method of the invention achieve this by way of a solenoid-operated valve with its armature disposed out of the primary flow path of the rinse fluid. This design dramatically reduces the likelihood that the armature and its housing will develop surface mineral deposits during use. Since armatures typically slide in the housing between open and closed positions, the resulting dramatic reduction in mineral roughening of the sliding surfaces results in significantly less wear stress on the valve and less contamination of the valve due to flaking and galling of rubbing surfaces. This increases the reliability and longevity of the valve and reduces the likelihood of a failure.

The valve design of the present invention relies upon differential fluid pressure in controlling the flow of rinse fluid through the valve. The use of differential fluid pressure in the valve design reduces the size required for the solenoid and provides for less current draw during operation of the armature than would otherwise be necessary. The valve also provides the unique teaching of self-venting, self-draining and freeze protection features in a single rinse valve block having a central solenoid-operated valve.

The rinse valve of the present invention thus includes a valve block having an inlet for receiving aqueous rinse fluid, primary and a secondary rinse fluid flow paths, and an outlet for providing rinse fluid to a waste receptacle or toilet. An inlet venting assembly is disposed in the valve block, a solenoid/poppet fixture is provided to control the flow of the rinse fluid in the primary flow path, and a vacuum breaker outlet assembly is disposed in the valve block downstream of the solenoid/poppet fixture.

The present invention includes an inlet venting assembly having a sleeve valve mounted between an expansion chamber and an inlet cavity that provides protection against damage due to freezing of rinse fluid inside of the valve. Upward movement of the sleeve valve into the expansion chamber accommodates the expanding volume taken up by any formation of freezing rinse fluid forming in the inlet cavity. This feature provide substantial protection against damage caused by rinse fluid freezing in the rinse valve.

BRIEF DESCRIPTION OF THE DRAWINGS

The above-noted and other advantages of the invention will be apparent from the description of the invention provided herein with reference to the attached drawings in which:

FIG. 4A is a view of a portion of the valve shown in FIG. 3;

FIG. 4B is an exploded view of a portion of the solenoid/poppet fixture shown in FIG. 4A;

DETAILED DESCRIPTION OF THE INVENTION

Figure 1:
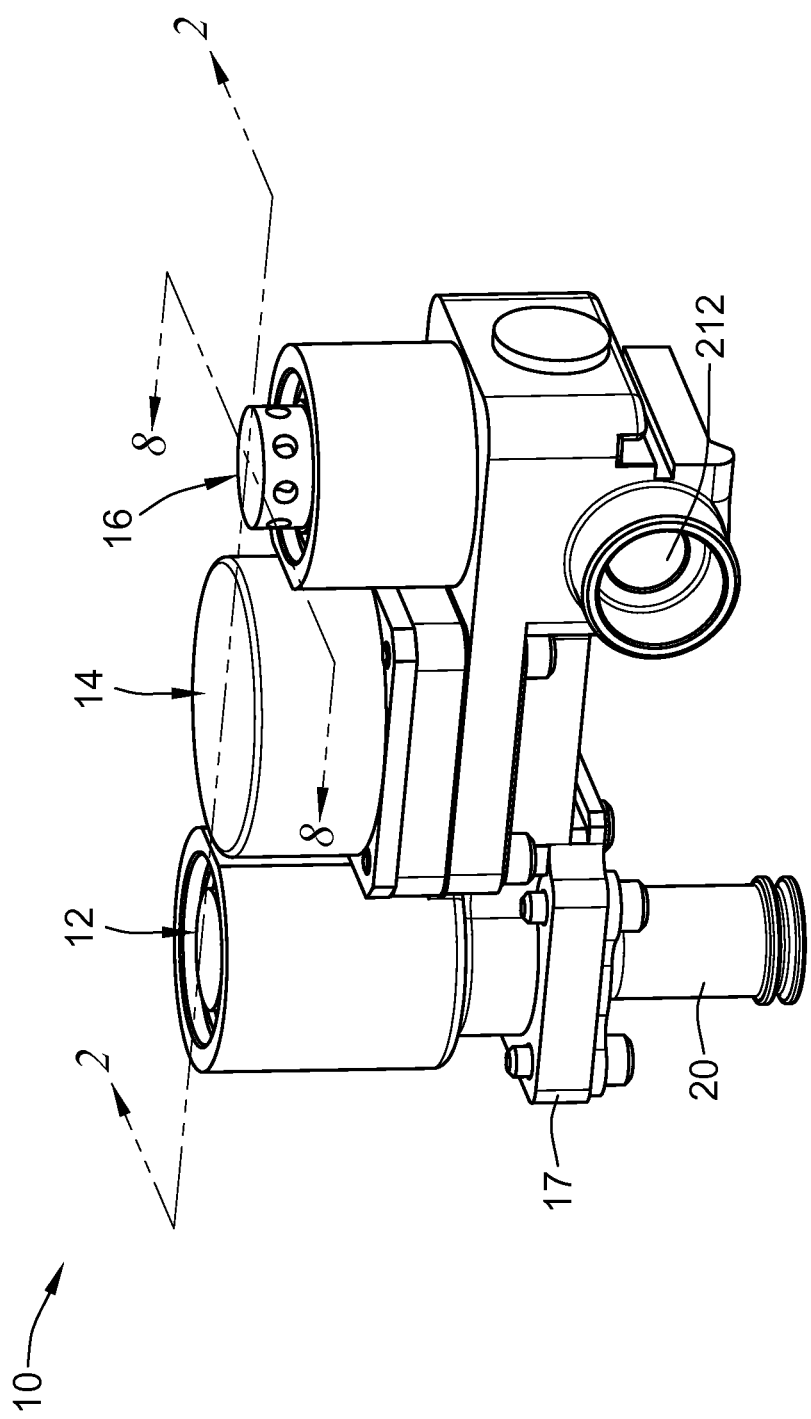
FIG. 1 is a perspective view of the outside of a rinse valve in accordance with the present invention.

The embodiment of the invention described below is not intended to be exhaustive or to limit the invention to the precise structure and operation disclosed. Rather, the embodiment described below has been chosen and described to explain the principles of the invention and its application, operation and use in order to best enable others skilled in the art to follow its teachings.

This invention is generally directed to a valve and method of controlling the flow of rinse fluid to vacuum waste receptacles, such as vacuum toilets and vacuum sinks which form part of a vacuum waste collection system in an aircraft. Turning now to the figures, the rinse valve 10 of the present invention includes an inlet venting assembly 12, a solenoid/poppet fixture 14 and a vacuum breaker outlet assembly 16 all mounted in a valve block 17.

Figure 2:
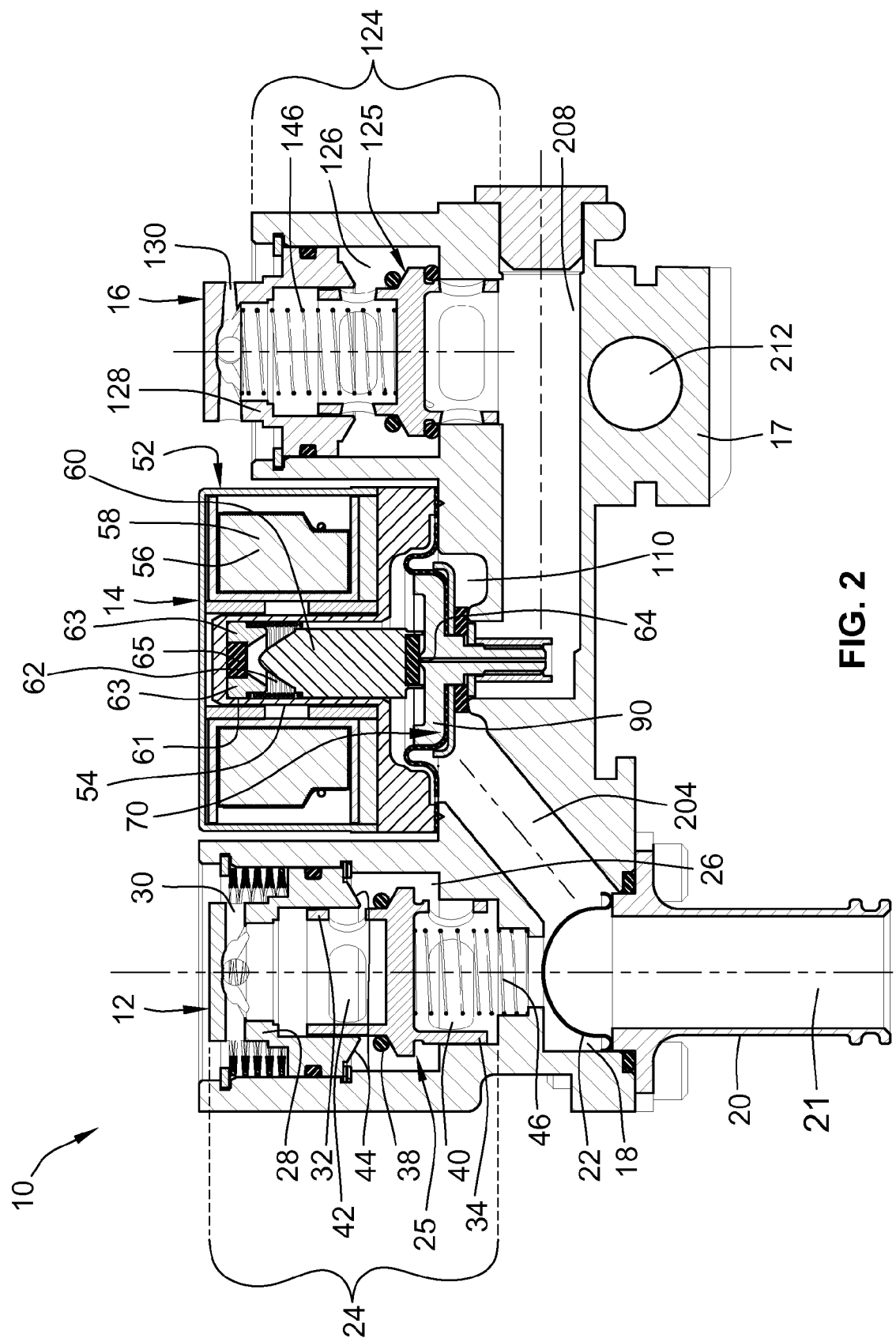
FIG. 2 is a cross-sectional view of the valve of FIG. 1, taken along lines 2-2 of FIG. 1.

As shown in FIG. 2, inlet venting assembly 12 includes an inlet cavity 18 into which an inlet fitting 20 is attached by suitable means. Aqueous rinse fluid will enter the rinse valve through a conduit 21 in inlet fitting 20, passing through an optional filter screen 22 located within the inlet cavity. The filter screen 22, sometimes referred to as a "bug screen," is United States Public Health Service compliant. The rinse fluid is preferably potable, although grey water may be used with this rinse valve if desired. Also, the rinse fluid may contain cleaning chemicals, if desired.

A sleeve valve 24 is mounted between an expansion chamber 27 and a sleeve valve cavity 26 that is opposite inlet cavity 18. Sleeve valve cavity 26 is in fluid communication with the inlet cavity 18, as shown for example in FIG. 2. Sleeve valve 24 comprises a sleeve 25 and a sleeve supporting member 28 mounted above the sleeve valve cavity 26. Sleeve 25 is supported within sleeve valve cavity 26 by the supporting sleeve member. Also, supporting sleeve member 28 has a vent opening 30 in communication with the atmosphere outside of the rinse valve.

Figure 7:
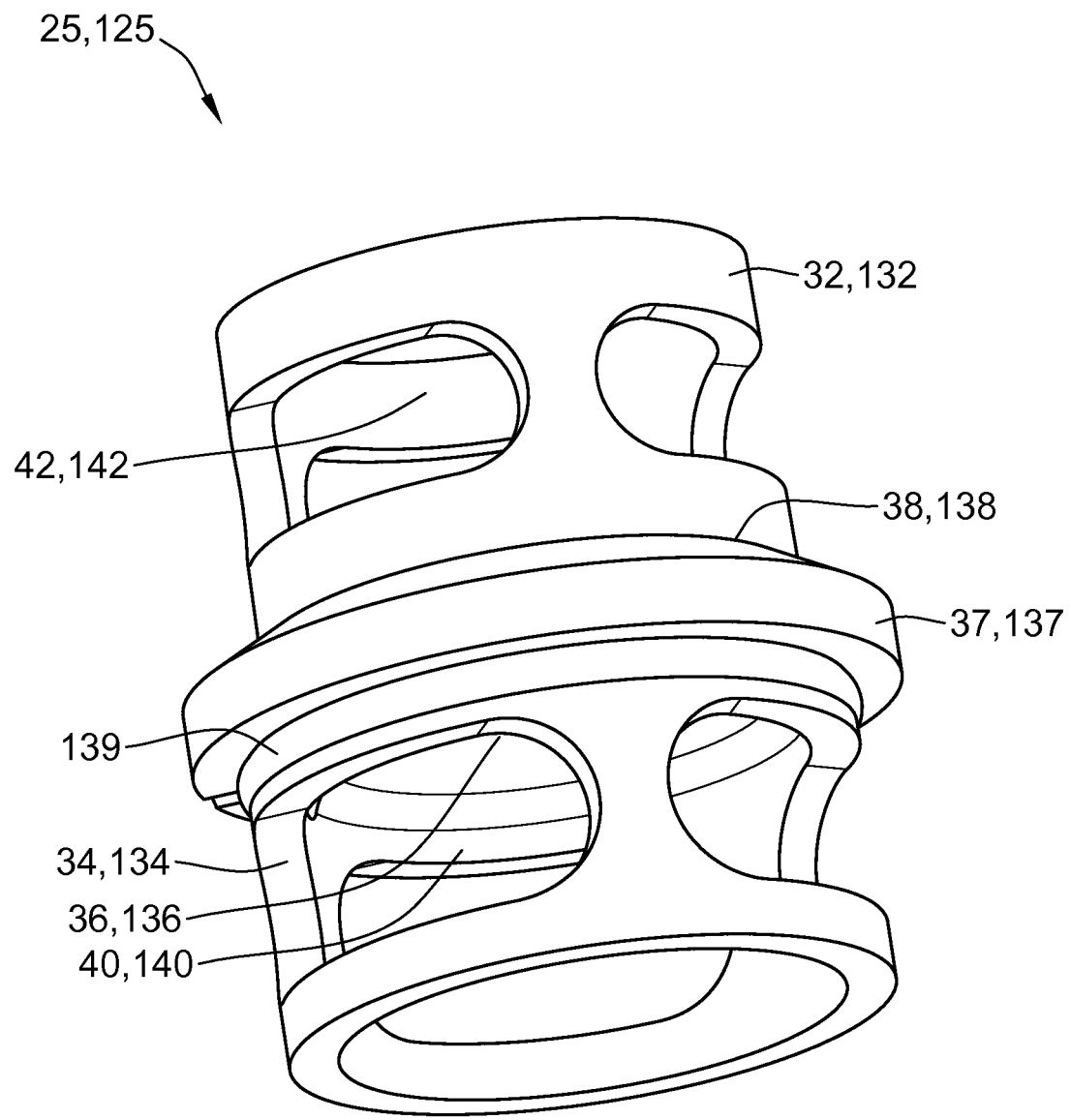
FIG. 7 is a perspective view of the sleeve of the sleeve valves used in the embodiment of the invention illustrated in FIG. 1.

Supporting sleeve member 28 has a cylindrical cavity for slidably receiving the sleeve 25. As shown in FIG. 7, sleeve 25 has an upper cylindrical portion 32, a lower cylindrical portion 34, and a partition 36 for blocking fluid flow between the cylinders. The peripheral walls of the cylinders have a plurality of ports 40, 42 extending through the walls. Also, an annular ledge 37 encircles the partition and extends outwardly from the cylindrical portions. An "O" ring 38 is positioned about the upper cylindrical portion 32 on top of the ledge 37. Although, FIG. 7 illustrates nearly identical sleeves of both the inlet venting assembly 12 and the vacuum breaker outlet assembly 16, it should be noted that the sleeve 25 of the inlet venting assembly 12 has only one "O" ring 38, whereas the sleeve of the vacuum breaker outlet assembly 16 includes two "O" rings 138, 139.

When there is no incoming rinse fluid pressure, sleeve 25 is biased so as to be maintained in the open position illustrated in FIG. 2 by a spring 46. In this position the sleeve valve is open so that air may flow from vent opening 30 past wall ports 40, 42 to the inlet cavity 18 and conduit 21. When the rinse fluid entering inlet cavity 18 exceeds a predetermined threshold value, sleeve 25 will slide up into supporting sleeve member 28, closing the sleeve valve 24 by way of the sealing engagement of "O" ring 38 against the bottom edge 44 of supporting sleeve member 28 thereby closing off access to port 30. Accordingly, the rinse fluid passes through inlet cavity 18 into sleeve valve cavity 26. Under normal conditions (non-freezing), the force of the rinse fluid is not great enough to move the sleeve 25 and the sleeve supporting member 28 upwardly against the biasing force provided by the spring 47 on the sleeve supporting member 28.

Figure 3:
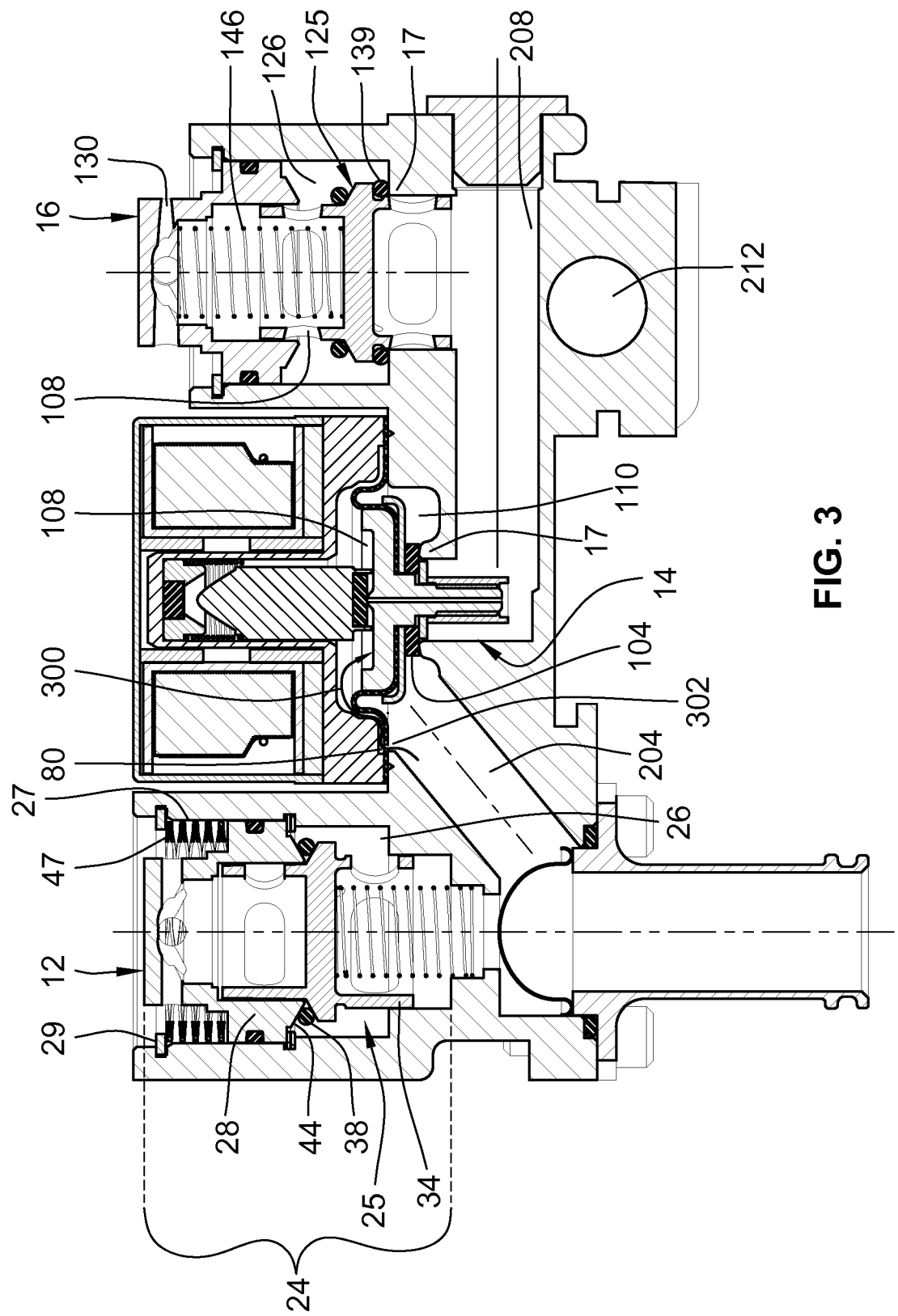
FIG. 3 is cross-sectional view of the valve of FIG. 1, taken along lines 2-2, showing the inlet venting assembly in the closed position and the armature of the solenoid/poppet fixture in the closed position.

FIG. 3 illustrates sleeve valve 24 in an upward closed position, permitting rinse fluid to flow into the sleeve valve cavity 26. On its way to this closed position, the sleeve valve will permit air in the system to escape. Finally, it should be noted that sleeve valve 24 may be replaced by other valve types that function comparably such as a float valve.

The rinse fluid moving past the closed sleeve valve 24 (FIG. 3) enters a first channel 204 and flows toward solenoid/poppet fixture 14. As shown in FIG. 2, this fixture includes a solenoid 52 and an armature 60 which moves within a pressure tube 54 to control the flow of the rinse fluid through the rinse valve in response to activation of the solenoid when the toilet is flushed. Solenoid 52 includes solenoid coils 56 disposed within a coil housing 58 and encircling the pressure tube. The armature 60 is positioned snugly and slideably within the pressure tube for movement upwardly against the bias of a spring 62 in response to activation of the solenoid coils. In a preferred embodiment, the armature may include a preferably rubber-type surface 64 at its distal end designed to engage a resilient poppet member 90, which will be described below. Other suitable surfaces may also be provided. As also explained below, because the armature 60 of the solenoid/poppet fixture is outside of the primary flow path of the rinse fluid, a very small solenoid with minimal current draw can operate the assembly. This small solenoid controls the substantial flow of rinse fluid past the assembly and ultimately from rinse valve 10 with minimal contact between the armature and the rinse fluid.

In a preferred embodiment, the pressure tube 54 may be made of Delrin® AF which contains polytetrafluoroethylene (Teflon®) to eliminate the need for lubrication between the armature 60 and the interior of the pressure tube 54. The use of Delrin® AF or another lubricious material or coating contributes to the improved reliability and efficiency of this valve because it substantially eliminates galling and flaking contamination. Additionally, this placement of the armature out of the primary flow path of the vast majority of the rinse fluid moving through the valve block increases the reliability and efficiency of the valve because the armature is not subject to the detrimental deposit buildup seen in typical rinse valve designs in which rinse fluid is in contact with a substantial portion of the armature as the valve is operated.

As shown in FIGS. 4A-B, the solenoid/poppet fixture 14 includes a poppet assembly 70 positioned opposite surface 64 of armature 60 and intersecting the primary flow path 200. Poppet assembly 70 comprises a poppet member 90 on the top, which rests within a cavity 77 within a resilient diaphragm 72. The diaphragm receives a rigid annular retainer 100 in an annular recess 79 in its bottom surface. A sealing ring 104 is positioned on a washer 106, which in turn rests on guide member 82, and abuts the bottom surface 105 of the annular retainer 100. Finally, guide member 82, which supports the sealing ring, is mounted for longitudinal movement in a circular cavity 18 in the valve block 17. The diaphragm, annular retainer, sealing ring, washer and guide have corresponding apertures for receiving a stem 92 which extends downwardly from the poppet member 90. The combination of the poppet member 90, diaphragm 72, retainer 100, sealing ring 104, washer 106 and guide 82 is held together by the mating of threads (not shown) inside of the guide aperture 86 with threads (not shown) on the stem 92.

Poppet member 90 has a circular platform 91 and a centrally located aperture 93. The platform also has a raised annular inner seat 94 and a raised outer lip 95 encircling a central clearance area 96 in the platform. Poppet member 90 also includes a longitudinal bore extending from aperture 93 through stem 92 defining a poppet channel 98. In a preferred embodiment, poppet member 90 is made of an engineered polymer, although the invention is not limited to the use of this material.

Diaphragm 72 is made of a resilient material. Material such as NBR/Poly Fabric or any other suitable resilient material may be used. The diaphragm includes a central aperture 74, a raised open ring portion 76, and a rim 78. The rim 78 has an annular recess 79 in its underside. In a preferred embodiment the diaphragm includes at least one pilot channel aperture 80 (as explained later) and includes at least one rim aperture 81 to aid in positioning and retaining the diaphragm in the block.

Retainer 100 has a central aperture 102 and an annular upstanding wall 103. Upstanding wall 103 is configured to nest within the annular cavity 79 in the underside of the diaphragm. The retainer 100 may be made of a rigid material.

Sealing ring 104 may be made from a resilient material. Such resilient material may include any rubber-type material. The sealing ring has a central aperture 107.

Finally, the assembly includes guide 82 having a top surface 84, and a bottom surface 85 which rests within a cavity 18 in the valve block 17. A guide aperture 86 is formed in the guide and extends the length of the guide. The guide is configured to move longitudinally within cavity 18 of the valve block. In the illustrated preferred embodiment, the guide has four arms 88 extending radially outwardly from the guide aperture 86 along the length of the guide. These arms 88 define passageways 83 in the cavity 18 for the rinse fluid to flow past the guide 82.

As illustrated in FIG. 2, vacuum breaker outlet assembly 16 includes a sleeve valve 124 mounted in a sleeve valve cavity 126 adjacent to a second channel 208 leading from the poppet assembly 70. The sleeve valve 124 comprises a sleeve 125 and a sleeve supporting member 128. Sleeve 125 is supported within sleeve valve cavity 126 by a supporting sleeve member 128 mounted above the sleeve valve cavity. Supporting sleeve valve member 128 has a vent opening 130 in communication with the atmosphere outside of the rinse valve. Sleeve valve cavity 126 is in fluid communication with the vent 130, as shown, for example in FIG. 2.

Supporting sleeve member 128 has a cylindrical cavity for slidably receiving the sleeve 125. As can best be seen in FIG. 7, sleeve 125 has an upper cylindrical portion 132, a lower cylindrical portion 134, and a partition 136 for blocking fluid flow between the cylinders. The peripheral walls of the cylinders have a plurality of ports 140, 142 extending through the walls. Also, an annular ledge 137 encircles the partition and extends outwardly from the cylindrical portions. An "O" ring 138 is positioned about the upper cylindrical portion 132 on top of the ledge 137 and an "O" ring 139 is positioned about the lower cylindrical portion 134 below the ledge 137.

Figure 5:
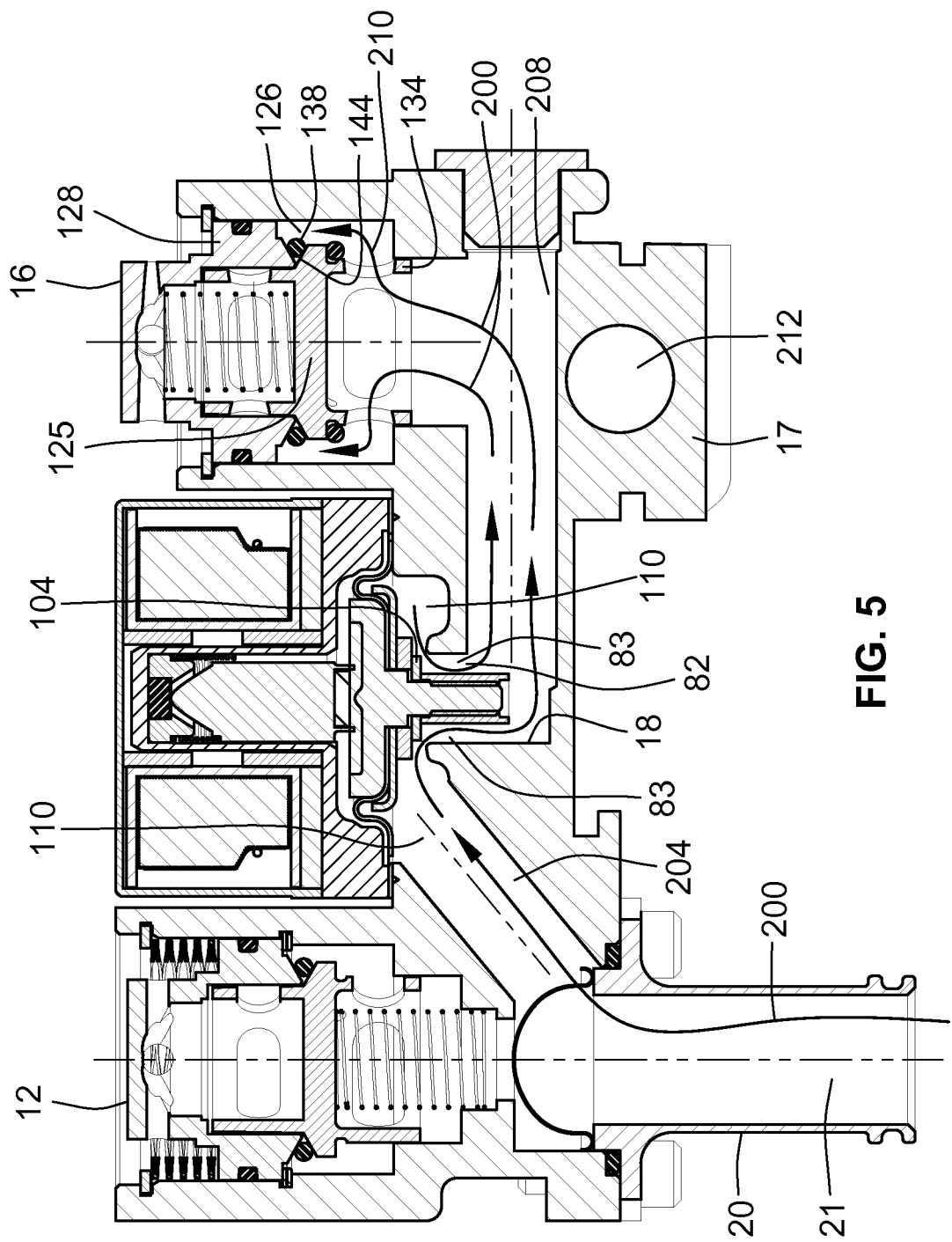
FIG. 5 is cross-sectional view of the valve of FIG. 1, taken along lines 2-2, showing the flow path of the rinse fluid when the armature of the solenoid/poppet fixture is in the open position and the vacuum breaker outlet assembly is in the closed position.

When there is no incoming rinse fluid pressure, sleeve 125 is biased by spring 146 in the position illustrated in FIG. 3. In this position the sleeve valve is open so that air may flow from vent opening 130 past wall port 142 to the sleeve valve cavity 126. As shown in FIG. 5, when the rinse fluid pressure in second channel 208 exceeds a predetermined threshold value, sleeve 125 will slide up into supporting sleeve member 128 against the bias of spring 146, closing the sleeve valve 124 by way of the sealing engagement of "O" ring 138 against the bottom edge 144 of supporting sleeve member 128 so that the rinse fluid passes through the sleeve valve cavity 126 to the toilet bowl. Finally, it should be noted that sleeve valve 124 may be replaced by other valve types that function comparably such as a float valve.

Valve block 17 includes a primary rinse fluid flow path 200 (FIG. 5) and a secondary rinse fluid flow path 300 (FIG. 3). The primary flow path 200 extends from the inlet fitting 20 to the outlet 212 (FIG. 8) leading to the toilet and is the flow path over which the vast majority of the rinse fluid will flow through the rinse valve to the toilet. The primary flow path 200 passes through conduit 21 defined by inlet fitting 20, a first channel 204, main chamber 110, guide passageways 83, a second channel 208 and a third channel 210 (FIG. 8) which flows through to the outlet 212.

Figure 8:
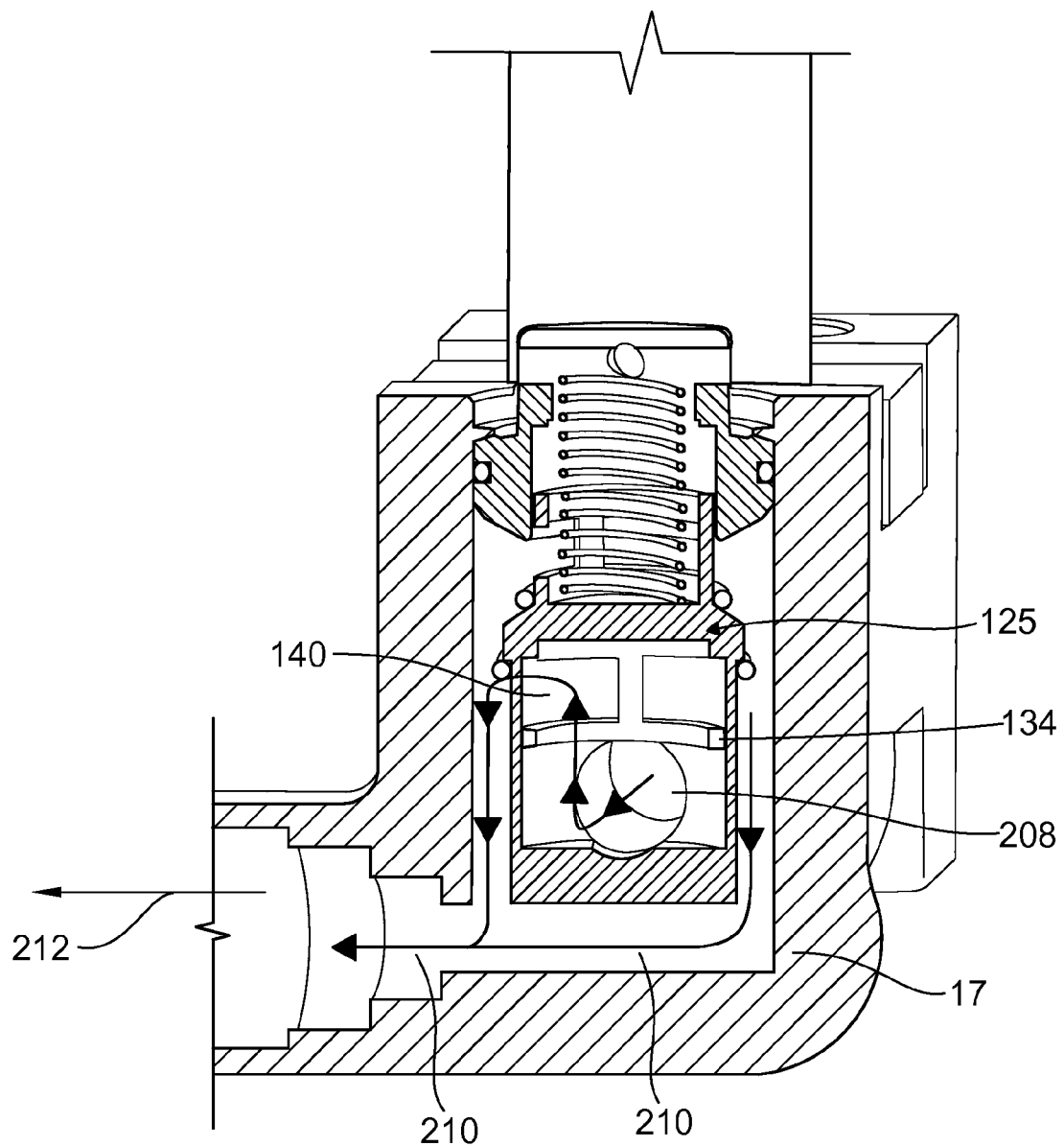
FIG. 8 is a cross-sectional view of a portion of the rinse valve of FIG. 1, taken along lines 8-8, showing the vacuum breaker outlet assembly of the rinse valve.

As illustrated by FIG. 5, the first channel 204 is formed in the valve block 17 and extends from the inlet fitting 20 to the main chamber 110. The guide passageways 83 are defined by the guide arms 88 and the cavity 18 in valve block 17 and extend the length of the guide 82. The second channel 208 is formed in the valve block 17 and extends from the end of the guide passageway 83 to the vacuum breaker outlet assembly 16. The third channel 210 is formed in the valve block 17 and extends through the lower cylindrical portion 134 of the sleeve 125 of the vacuum breaker outlet assembly 16 to the outlet 212 (FIG. 8).

Turning now to FIG. 3, the secondary flow path 300 moves through a pilot channel 302 to pilot chamber 108. The pilot channel 302 branches off of the first channel 204 providing a narrow flow path from the first channel 204, through the pilot channel aperture 80 in the diaphragm, to the pilot chamber 108.

In operation, initially the sleeve valve 24 of the inlet venting assembly 12 is in the position illustrated in FIG. 2. Ambient air entering the vent 30 is in fluid communication via the sleeve valve 24 with conduit 21 of inlet fitting 20. When rinse fluid first enters the inlet cavity 18, the pressure of the oncoming rinse fluid against the partition 36 (FIG. 7) causes the sleeve 25 to slide up into the supporting sleeve member 28 thereby moving the sleeve valve 24 to the closed position seen in FIG. 3. "O" ring 38 is pushed against the bottom edge 44 of the supporting sleeve member 28 sealing the sleeve valve cavity 26 from receiving ambient air and allowing rinse fluid to fill the sleeve valve cavity 26.

As seen in FIG. 3, the rinse fluid also flows through the first channel 204 filling the main chamber 110 and flowing into the secondary flow path 300 filling the pilot chamber 108. The rinse valve remains in this inactive state with the main chamber and the pilot chamber substantially filled and the sleeve valve 24 closed until a user flushes the toilet or the rinse valve is drained during servicing.

As shown in FIG. 4, when the rinse valve is in the inactive state the armature 60 engages the raised inner seat 94 of the poppet member 90 in a closed position. The spring 62 (FIG. 2) urges the armature against the inner seat 94. The dimensions and shape of the inner seat 94 (FIG. 4) provide a small sealing surface for the armature 60 and thus result in a higher applied sealing pressure and more efficient seal than if the sealing surface had instead been the entire surface of the poppet 90. When the armature 60 is in the closed position shown in FIG. 4, rinse fluid in the pilot chamber 108 is blocked by the armature from draining through the poppet channel 98.

The rinse fluid in pilot chamber 108 exerts downward pressure against the poppet member 90. The central clearance area 96 is dimensioned to be a larger surface area than the bottom surface of the retainer 100 against which rinse fluid in the main chamber 110 exerts an upward pressure. Because of the larger area of the central clearance area 96, the rinse fluid in the pilot chamber 108 exerts a greater downward force on the upper surface of the poppet assembly 70 than the upward force exerted on the backside of the poppet assembly 70 by the rinse fluid in the main chamber 110. This downward pressure helps to keep the poppet assembly 70 in the closed position so that less force is required by the armature spring 62 (FIG. 2) to hold the poppet assembly closed with the sealing ring 104 engaged against the valve block 17.

Figure 6:
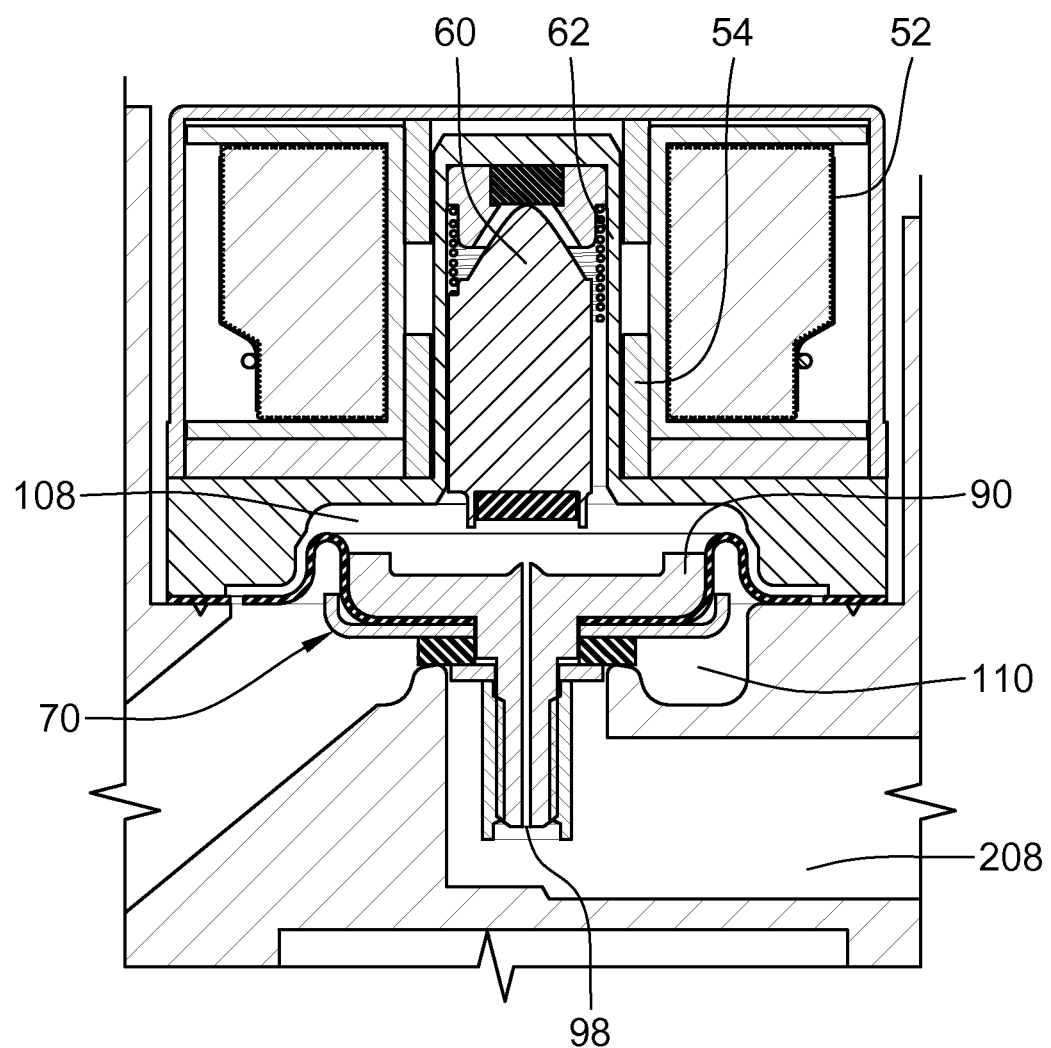
FIG. 6 is a cross sectional view of a portion of the valve of FIG. 1, taken along lines 2-2, showing the armature in the open position and the poppet of the solenoid/poppet fixture in the closed position.

When a user actuates the flush switch, a signal is sent to the solenoid 52 (FIG. 6). The solenoid is energized in response to the signal and the armature 60 is drawn upward overcoming the force of the spring 62 and moving upwardly in the pressure tube 54 away from the entrance to the poppet channel 98 as shown in FIG. 6. Rinse fluid present in the pilot chamber 108 drains through the poppet channel 98 to the second channel 208 (FIG. 6) thereby reducing the fluid pressure exerted on the upper side of the poppet assembly 70. The force exerted by the rinse fluid on the backside of the poppet assembly 70 is now greater than the force exerted on the upper side of poppet assembly 70 thus enabling the force on the backside to move the poppet assembly 70 upward to the open position illustrated in FIG. 5. When the poppet assembly 70 moves upward, the sealing ring 104 is lifted off of the valve block 17 and the guide 82 is moved upward so that rinse fluid from the first channel 204 and the main chamber 110 flows into the guide passageway 83 to the second channel 208. From there, rinse fluid flows to the vacuum breaker outlet assembly 16.

When the pressure exerted by the entering rinse fluid on the partition 136 of vacuum breaker outlet assembly 16 exceeds a predetermined threshold value, sleeve 125 will slide up into supporting sleeve member 128, closing the sleeve valve 124 by way of the sealing engagement of "O" ring 138 against the bottom 144 of supporting sleeve member 128 and permitting the rinse fluid to pass from the second channel 208 through the sleeve valve cavity 126 and third channel 210 to the outlet 212 (as illustrated in FIGS. 5 and 8) where appropriate piping is provided to transport the rinse fluid to the toilet. As long as the armature 60 remains open, the rinse fluid flows along the primary flow path 200.

As can be seen in FIG. 5, the armature 60 is disposed out of the primary flow path 200 of the rinse fluid. As noted earlier, typical prior designs dispose armatures directly in the primary flow path of the rinse fluid; the passage of rinse fluid combined with draining of the armature during servicing creates surface mineral deposit build-up on the armature and the internal surfaces of the housing surrounding the armature. Over time this build-up causes the armature to malfunction, first, by slowing the movement of the armature and, ultimately, by causing the armature to become seized in an open or closed position. A rinse valve with an armature seized in the closed position will not provide rinse fluid to a waste receptacle, and an armature seized in an open position will cause flooding of the waste receptacle. Locating the armature out of the primary flow path dramatically reduces the likelihood that the armature and its housing will develop detrimental surface mineral deposits; this design increases the reliability and longevity of the valve.

An armature stop 61 comprising a metal conical shell 63 encircling a flat, elastomer or rubber-type pad 65 is positioned at the top of the pressure tube 54. The metal conical shell 63 creates a stronger magnetic force on the armature for a given amount of current than would otherwise be present. When the solenoid is energized when a flush signal is applied, the armature moves to the open position seating against the pad 65. When a flush signal is no longer received by the solenoid, the solenoid is no longer actuated and the armature 60 slides downwardly aided by the force of the spring 62. Use of the rubber-type pad 65 in the armature stop 61 provides a rebound effect that ensures that the armature will not remain in the open position due to residual magnetism present in the armature stop 61.

The downward moving armature 60 pushes the poppet assembly 70 downward to a point where the flow of rinse fluid through the guide passageways 83 is reduced and rinse fluid begins flowing again to the secondary flow path 300. However, because the armature 60 is covering the opening to the poppet channel 98, rinse fluid cannot enter the poppet channel 98. This blockage causes the rinse fluid to build up in the pilot chamber 108 and results in pressure from the rinse fluid in the pilot chamber 108 being exerted on the upper surface of the poppet assembly 70. This pressure on the upper surface builds up until it exerts a greater downward force on the poppet assembly 70 than the upward force exerted on the backside of the poppet assembly 70 by the rinse fluid in the main chamber 110. This force differential assists in moving the poppet assembly further downward into the closed position illustrated in FIG. 3 with the sealing ring 104 engaged against the valve block 17. Rinse fluid stops flowing to the second channel 208 and to the vacuum breaker outlet assembly 16.

Once rinse fluid stops flowing to the vacuum breaker outlet assembly 16 (FIG. 4), rinse fluid pressure no longer holds the sleeve valve 124 closed and the sleeve 125 slides downward until the "O" ring 139 engages and seals against the valve block 17. The flow of rinse fluid is shut off to the outlet 212 and fluid communication of air between the vent 130 and the outlet 212 is re-established through the sleeve valve 124. In the event of a blockage severe enough to cause waste receptacle fluid to rise to the waste receptacle nozzles and flow backward into the vacuum breaker outlet assembly 16, the backward flow of the waste receptacle fluid may fill the sleeve valve cavity 126 but will not be able to enter the rinse valve through the vacuum breaker outlet assembly 16 because the downward pressure exerted by the contaminated fluid on the sleeve 125 will keep the sleeve 125 down and sealed by the "O" ring 139 thereby stopping contaminated fluid from flowing through the valve 10 and into the potable or gray water system.

While rinse fluid is not drained from the valve 10 after each time the actuator is actuated (after each flush by a user), it may be drained when the plane is serviced. During draining of the valve, the flow of rinse fluid into the inlet fitting 20 is stopped and rinse fluid drains out of the valve 10. The armature 60 is closed during such draining.

As the rinse fluid drains out of the valve 10, the pressure on the partition 36 of the inlet venting assembly 12 is reduced and the sleeve 25 slides downward to the position illustrated in FIG. 2 where the sleeve 25 is supported by the spring 46. Ambient air from the vent 30 is in fluid communication with inlet fitting 20 through the sleeve valve 24. This venting prevents a vacuum from forming in the valve 10 while the rinse fluid drains.

Figure 9:
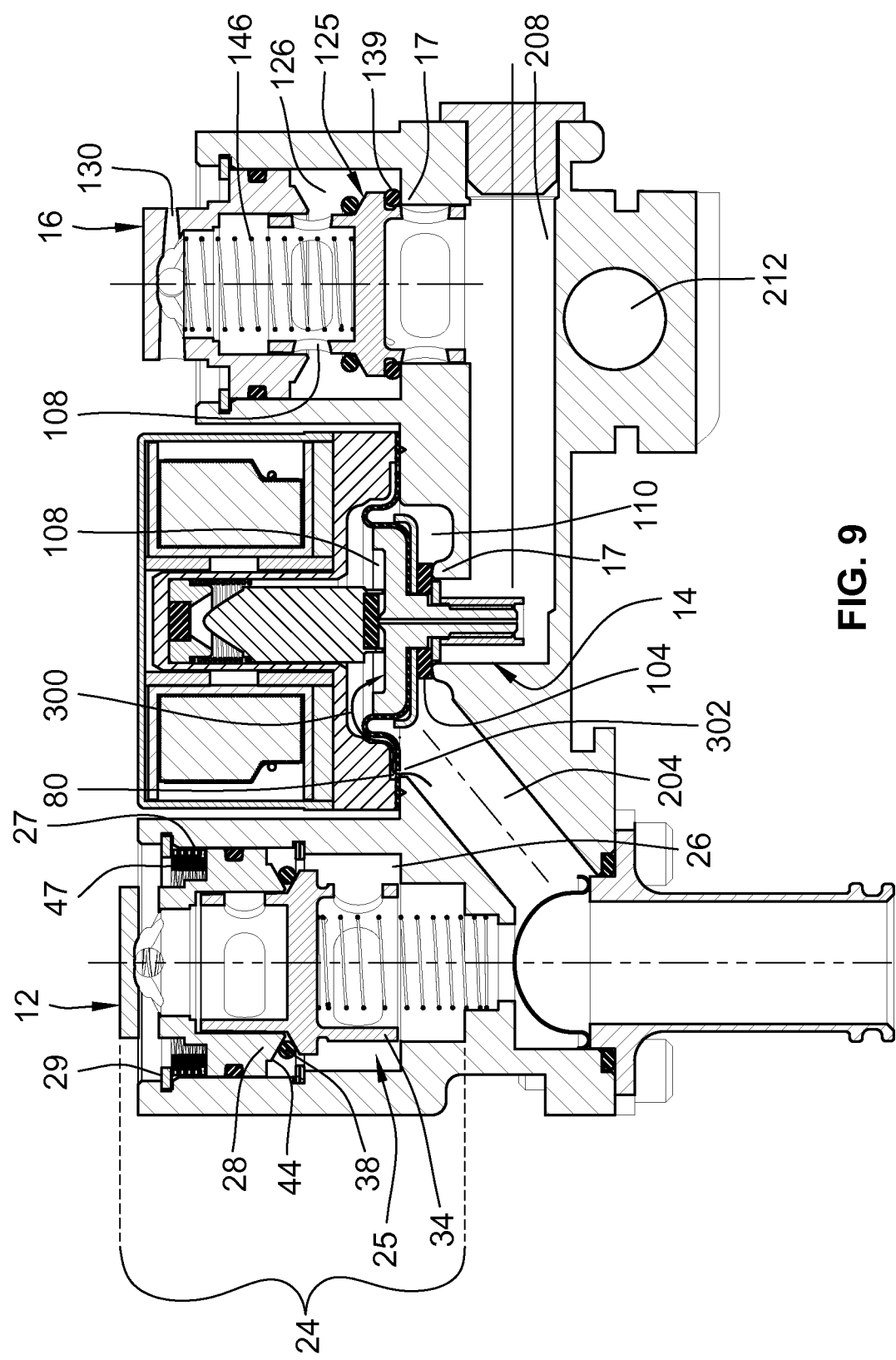
FIG. 9 is a cross-sectional view of the valve of FIG. 1, corresponding to FIG. 2 in which the inlet venting assembly has moved into the expansion chamber and the armature of the solenoid/poppet fixture is in the closed position.

The present invention includes design features that provide protection against damage caused by the freezing of rinse fluid inside of the valve. As illustrated in FIG. 9, the sleeve valve 24 is mounted between the expansion chamber 27 and the sleeve valve cavity 26. A spring 47 is positioned between the sleeve supporting member 28 and the rim 29 of the expansion chamber 27. In the inactive state before flushing or draining (FIG. 3), the sleeve valve 24 is disposed in an upward closed position with rinse fluid present in the sleeve valve cavity 26, the first channel 204, the main chamber 110, the secondary flow path 300 and the pilot chamber 108. If the aqueous rinse fluid freezes, it will expand and exert force on the internal cavities of the rinse valve.

FIG. 9 illustrates the rinse valve 10 when the force of the expanding rinse fluid has pushed the sleeve 25 and the sleeve supporting member 28 upwards against the force of the spring 47 into the expansion chamber 27. This upward movement of the sleeve 25 and the sleeve supporting member 28 accommodates the expanding area required by the freezing fluid by decreasing the size of the expansion chamber and, thus, increasing the volume available in the sleeve valve cavity 26. The features of the inlet venting assembly 12 described above provide substantial protection against damage caused by rinse fluid freezing in the rinse valve 10.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A rinse valve for controlling the flow of rinse fluid to a vacuum waste receptacle comprising:
    a valve block comprising:
    an inlet that receives rinse fluid,
    a venting assembly disposed in the valve block proximal and connected to the inlet for venting any air that enters the inlet,
    a solenoid-driven fluid control device,
    a vacuum breaker outlet assembly, and
    an outlet that supplies rinse fluid from the rinse valve to the waste receptacle,
    the fluid control device selectively establishing fluid communication between the inlet and the outlet; and
    a channel in the valve block for conducting rinse fluid in a primary rinse fluid flow path from the inlet to the venting assembly, from the venting assembly to the fluid control device, from the fluid control device to the vacuum breaker outlet assembly, and from the vacuum breaker outlet assembly to the outlet to the waste receptacle wherein:
    the venting assembly disposed in the valve block includes a first sleeve valve with a first sleeve supporting member having a vent opening in communication with the atmosphere outside of the rinse valve, and
    the first sleeve has upper and lower portions each including a peripheral wall having openings extending through the wall and a partition for blocking fluid flow between the upper and lower portions.

2. The rinse valve of claim 1, further comprising a screen positioned in the channel between the venting assembly and the fluid control device.

3. The rinse valve of claim 1, wherein the first sleeve valve is biased open after the rinse valve is drained allowing ambient air to flow from the vent to the channel.

4. The rinse valve of claim 1, wherein the second sleeve valve includes a second sleeve and a second sleeve supporting member, the second sleeve supporting member slidably receiving the second sleeve, the second sleeve supporting member having a vent opening in communication with the atmosphere outside of the rinse valve.

5. A rinse valve for controlling the flow of rinse fluid to a vacuum waste receptacle comprising:
    a valve block comprising:
    an inlet that receives rinse fluid,
    a venting assembly proximal and connected to the inlet for venting any air that enters the inlet,
    a solenoid-driven fluid control device,
    a vacuum breaker outlet assembly, and
    an outlet that supplies rinse fluid from the rinse valve to the waste receptacle,
    the fluid control device selectively establishing fluid communication between the inlet and the outlet; and
    a channel in the valve block for conducting rinse fluid in a primary rinse fluid flow path from the inlet to the venting assembly, from the venting assembly to the fluid control device, from the fluid control device to the vacuum breaker outlet assembly, and from the vacuum breaker outlet assembly to the outlet to the waste receptacle; wherein:
    the inlet venting assembly includes a first sleeve valve and the vacuum breaker outlet assembly includes a second sleeve valve,
    the first sleeve valve includes a first sleeve and a first sleeve supporting member, the first sleeve supporting member slidably receiving the first sleeve, the first sleeve supporting member having a vent opening in communication with the atmosphere outside of the rinse valve,
    the first sleeve has an upper portion, a lower portion and a partition for blocking fluid flow between the upper and lower portions of the first sleeve, and
    the upper and lower portions of the first sleeve each include a peripheral wall having openings extending through the wall.

* * * * *